United States Patent Office 3,089,818
Patented May 14, 1963

3,089,818
WATER DISPERSIBLE ANTIBIOTICS
Irwin M. Stone, Staten Island, N.Y., assignor to
Baxter Laboratories, Inc.
No Drawing. Filed June 2, 1960, Ser. No. 33,402
5 Claims. (Cl. 167—65)

The present invention relates to a method of increasing the water dispersibility of polypeptide antibiotics and to the products thus obtained.

The polypeptide antibiotics such as gramicidin, tyrocidine, and tyrothricin, although they are highly effective against most gram-positive bacteria and many gram-negative bacteria have found only limited human and veterinary medical use because of their limited dispersibility in aqueous media.

In the past, various methods have been devised to prepare aqueous solutions of the polypeptide antibiotics. The method which has found the most widespread acceptance comprises adding an alcohol solution of the polypeptide antibiotic to the water. This method, however, can only be used for the formation of clear aqueous solutions containing small amounts of the antibiotic, e.g. about 0.1% by weight, as higher concentrations of the antibiotic promptly precipitate.

It has now been discovered that the water-dispersibility of the polypeptide antibiotics can be greatly increased by the method which comprises dissolving the antibiotic and a water soluble polymeric material in a mutual non-aqueous solvent, and then removing the non-aqueous solvent to obtain a dry, stable, readily water-dispersible, complex of the antibiotic and the polymeric material. The complex thus formed may be used to form clear, stable, non-alcoholic solutions containing 2% or more of the antibiotic by weight. In addition to improving the water-solubility of the antibiotic, other desirable properties of the antibiotics are enhanced. For instance, in microbial inhibition studies using seeded agar plates and cellulose discs saturated with the solution, tyrothricin in solutions prepared by previously known methods, because of the limited diffusibility of the antibiotic, appears to be only weakly active, whereas the tyrothricin in solutions prepared from the complexes of the present invention readily diffuses to provide substantial zones of bacterial inhibition. Furthermore, the antimicrobial efficacy of the complexed antibiotic is enhanced because it is relatively less adversely affected by the conditions of the biological environment under practical conditions of use than is the uncomplexed antibiotic.

In the preferred practice of the present invention the polypeptide antibiotic is dissolved in a lower alkyl alcohol such as methanol, ethanol, propanol or the like, and to this is added the polymeric material in the same or a mutually compatible non-aqueous solvent. The resulting solution is then spread out thinly upon a flat surface and allowed to evaporate to dryness to obtain the water soluble complex.

The exact mechanism by which the polymeric material and the polypeptide antibiotic unite to form the readily soluble complex is not known. It is theorized, however, that during the drying step the molecules of the polymeric material and the antibiotic are brought into closer and closer contact until they are firmly bound into a complex by the various molecular binding forces. It would appear that the intermolecular bonding necessary to form the highly water soluble complex is dependent upon each of the original constituents being in solution. Verification of this belief may be found in the observation that the highly soluble complexes of the present invention are not formed by dry mixing the antibiotic and the polymeric material.

Illustrative of the polymeric materials which are highly water soluble and likewise soluble in at least one of the solvents for the polypeptide antibiotics are the following:

(a) The polyvinyl pyrrolidones such as those described in U.S. Patent 2,265,450 and their copolymers with vinyl acetate and similar monomers. These may vary from relatively low molecular weight polymers with Fikentscher K values of about 10 or lower to the relatively high molecular weight polymers with values of K90 or higher.

(b) The poly-N-vinyl oxazolidinones such as poly-N-vinyl-2-oxazolidinone, poly-N vinyl-5-methyl-2-oxazolidinone, poly N-vinyl-5-ethyl-2-oxazolidinone, poly-N vinyl dinone, poly N-vinyl-5-ethyl-2-oxazolidinone, poly-N vinyl 4,5, dimethyl-2-oxazolidinone and their derivatives and copolymers. These may vary from the low molecular weight polymers with Fikentscher K values of about K10, K90 or higher.

(c) The block copolymers of polyoxyethylene and polyoxypropylene. These polymers may be prepared by controlled polymerization to produce polymers comprising a core of a water-insoluble polyoxypropylene chain to which is attached at each end water soluble polyoxyethylene groups. Control over the lengths of the chains and groups results in polymers with varying molecular weights and solubilities. Illustrative of these types of polymers and related polymers such as those described in U.S. Patent 2,882,171 are the products sold under the trade-marks Pluronic and Tetronic by Wyandotte Chemical Corporation, Wyandotte, Michigan.

The amount of a single polymeric material or a combination of polymeric materials to be used in forming the most desirable complex for each specific polypeptide antibiotic or combination of antibiotic is best determined by trial testing. In general, however, the amount of total polymeric material required to form a satisfactory complex is about equal to 25% of and not greater than 30 times the weight of the antibiotic. Larger amounts may, of course, be used, but without particular advantage.

The non-aqueous solvents preferred for use in the practice of the present invention are those solvents which in addition to being solvents for the materials at room temperatures may be readily removed to obtain the desired complex. Illustrative of such solvents are methanol, ethanol, isopropanol, benzyl alcohol, pyridine and the like. Other non-aqueous solvents may also be used, but their removal may require elaborate steps. The specific non-aqueous solvent or combination of compatible non-aqueous solvents to be used in any specific case depends, of course, upon the choice of materials to be complexed.

While the removal of the solvent may be accomplished by evaporation at room temperature, for instance, by spreading in a thin layer on glass plates, this method is generally suitable only for the preparation of small amounts of the complexes. For the preparation of larger amounts other techniques such as drum drying or other types of commercial drying methods may be used.

The practice of the present invention is further illustrated by reference to the following examples in which all "parts" and "percentages" are expressed as "parts and percentages" by weight unless otherwise specified.

*Example I*

One part of tyrothricin and 2 parts of the polyvinyl pyrrolidone (K60) were dissolved in 20 parts of ethanol. The solution was spread upon a sheet of glass and allowed to dry at room temperature. The dried complex of the PVP and tyrothricin was then collected. A clear aqueous solution containing 2% of tyrothricin by weight was readily prepared by simply dissolving the complex in water. The resulting solution when tested for bacterial inhibition was found to have enhanced anti-bacterial action.

*Example II*

The procedure of Example I was repeated using methanol in place of ethanol and two parts of a polyoxyethylene-polyoxypropylene block copolymer (Pluronic F68) in place of the PVP (K30) with essentially identical results.

*Example III*

The procedure of Example I was repeated employing 5 parts of poly N-vinyl-2-oxazolidone (K30) in place of the polyvinyl pyrrolidone (K30) with essentially identical results.

*Example IV*

The procedure of Example I was repeated employing 0.5 part of polyoxyethylene-polyoxypropylene block copolymer (Pluronic F77) in place of the polyvinyl pyrrolidone (K30) with identical results.

*Example V*

The procedure of Example I was repeated employing 2 parts of a mixture containing equal amounts of polyvinyl pyrrolidone (K90) and a polyoxyethylene-polyoxypropylene block copolymer (Pluronic F77) in place of the PVP (K30).

*Example VI*

One part of tyrocidine hydrochloride and two parts of polyvinyl pyrrolidone (K30) were dissolved in 20 parts of methanol. The solution was spread in a thin layer and allowed to evaporate to dryness at room temperature. The dried complex of the normally insoluble tyrocidine and the polymer dissolved readily in water to form clear anti-bacterial solutions containing 2% by weight in water.

*Example VII*

The procedure of Example VI was repeated employing 3 parts of the copolymer of vinyl pyrrolidone and polyvinyl acetate (50–50) in place of the polyvinyl pyrrolidone (K30) with essentially identical results.

*Example VIII*

The procedure of Example VI was repeated employing 9 parts of poly N-vinyl-2-oxazolidone (K30) in place of the polyvinyl pyrrolidone (K30) with essentially identical results.

*Example IX*

The procedure of Example VI was repeated employing 0.25 part of polyoxyethylene-polyoxypropylene block copolymer (Pluronic F68) in place of the polyvinyl pyrrolidone (K30) with identical results.

*Example X*

The procedure of Example VI was repeated employing 4 parts of the copolymer of vinyl pyrrolidone and polyvinyl alcohol (50–50) in place of the polyvinyl pyrrolidone (K30) with essentially identical results.

*Example XI*

The procedure of Example VI was repeated employing 1 part of a polyoxyethylene-polyoxypropylene block copolymer (Pluronic F68) in place of the PVP (K30).

*Example XII*

One part of gramicidin and 4 parts of polyoxyethylene-polyoxypropylene block copolymer (Pluronic F68) were dissolved in 20 parts of methanol. The solution was spread upon a sheet of glass and allowed to dry at room temperature. The dried complex of the polymeric material and gramicidin was then collected. A clear aqueous solution containing 2% of gramicidin by weight was readily prepared by simply dissolving the complex in water. The resulting solution when tested for bacterial inhibition was found to have retained its anti-bacterial action.

*Example XIII*

The procedure of Example XII was repeated employing 3 parts of polyvinyl pyrrolidone (K30) in place of the polyoxyethylene-polyoxypropylene block copolymer with essentially identical results.

*Example XIV*

The procedure of Example XII was repeated employing 3 parts of poly-N-vinyl-2-oxazolidone (K30) in place of the polyoxyethylene-polyoxypropylene block copolymer with essentially identical results.

*Example XV*

One part of gramicidin, 0.4 part of tyrocidine hydrochloride and 19 parts of polyvinyl pyrrolidone (K90) were dissolved in methanol and the solution spread out thinly and allowed to evaporate to dryness. A clear 2% solution by weight of the antibiotic mixture was readily prepared by simply dissolving the complex in water.

It will be readily apparent to those skilled in the art that in addition to the specific embodiments described in the above examples, a wide variety of modifications may be made without departing from the spirit and scope of the present invention. It will likewise be apparent that the exercise of the present invention provides not only means of preparing clear aqueous solutions of the insoluble polypeptide antibiotics but also provides a dry form of the antibiotic which is storage-stable and convenient to use.

The embodiments of the present invention in which an exclusive property or privilege is claimed are defined as follows.

I claim:
1. The method of solubilizing a relatively insoluble polypeptide antibiotic which comprises,
 (a) dissolving said antibiotic and a highly soluble polymeric material selected from the class consisting of: polyvinyl pyrrolidone, polyvinyl oxazolidones, polyoxyethylene-polypropylene block copolymers and vinyl pyrrolidone and vinyl acetate copolymers in a mutual essentially non-aqueous solvent,
 (b) and then removing substantially all of said solvent to obtain a readily water-soluble molecular complex.
2. A readily water-soluble molecular complex prepared by the method of claim 1.
3. A readily water-soluble molecular complex prepared by the method of claim 1 in which the polypeptide antibiotic is tyrothricin.
4. A readily water-soluble molecular complex prepared by the method of claim 1 in which the polypeptide antibiotic is gramicidin.
5. A readily water-soluble molecular complex prepared by the method of claim 1 in which the polypeptide antibiotic is tyrocidine.

References Cited in the file of this patent

UNITED STATES PATENTS

| | | |
|---|---|---|
| 2,472,640 | Wilcox et al. | June 7, 1949 |
| 2,611,731 | Rawlins et al. | Sept. 23, 1952 |

(Other references on following page)

UNITED STATES PATENTS

| | | |
|---|---|---|
| 2,658,045 | Schildknecht | Nov. 3, 1953 |
| 2,688,550 | McFarlane | Sept. 7, 1954 |
| 2,739,922 | Shelanski | Mar. 27, 1956 |
| 2,811,449 | Witwer et al. | Oct. 29, 1957 |
| 2,822,314 | Ferlauto et al. | Feb. 4, 1958 |
| 2,872,321 | Walles et al. | Feb. 3, 1959 |
| 2,872,322 | Walles et al. | Feb. 3, 1959 |
| 2,873,192 | Walles et al. | Feb. 10, 1959 |
| 2,897,120 | Cronin et al. | July 28, 1959 |
| 2,946,773 | Walles et al. | July 26, 1960 |
| 2,948,708 | Walles et al. | Aug. 9, 1960 |

FOREIGN PATENTS

| | | |
|---|---|---|
| 759,577 | Great Britain | Oct. 17, 1956 |
| 784,659 | Great Britain | Oct. 16, 1957 |
| 794,482 | Great Britain | May 7, 1958 |

OTHER REFERENCES

Drechsel, "N-Vinyl-2-Oxazolidone," Journal of Organic Chemistry, vol. 22, pp. 849–851, July 1957.